INVENTOR
NELSON W. BURKE

BY Russell, Chittick & Pfund
ATTORNEY

Dec. 26, 1967 N. W. BURKE 3,360,605
FSK TRANSCEIVER WITH SCR SWITCHING BETWEEN
TRANSMIT AND RECEIVE MODES
Filed May 7, 1965 2 Sheets-Sheet 2

INVENTOR
NELSON W. BURKE
BY Russell, Chittick & Pfund
ATTORNEY 3,360,605

FSK TRANSCEIVER WITH SCR SWITCHING BETWEEN TRANSMIT AND RECEIVE MODES

Nelson W. Burke, Stoneham, Mass., assignor to Honeywell Inc., Minneapolis, Minn., a corporation of Delaware Filed May 7, 1965, Ser. No. 453,959
8 Claims. (Cl. 178—66)

Figure 1:
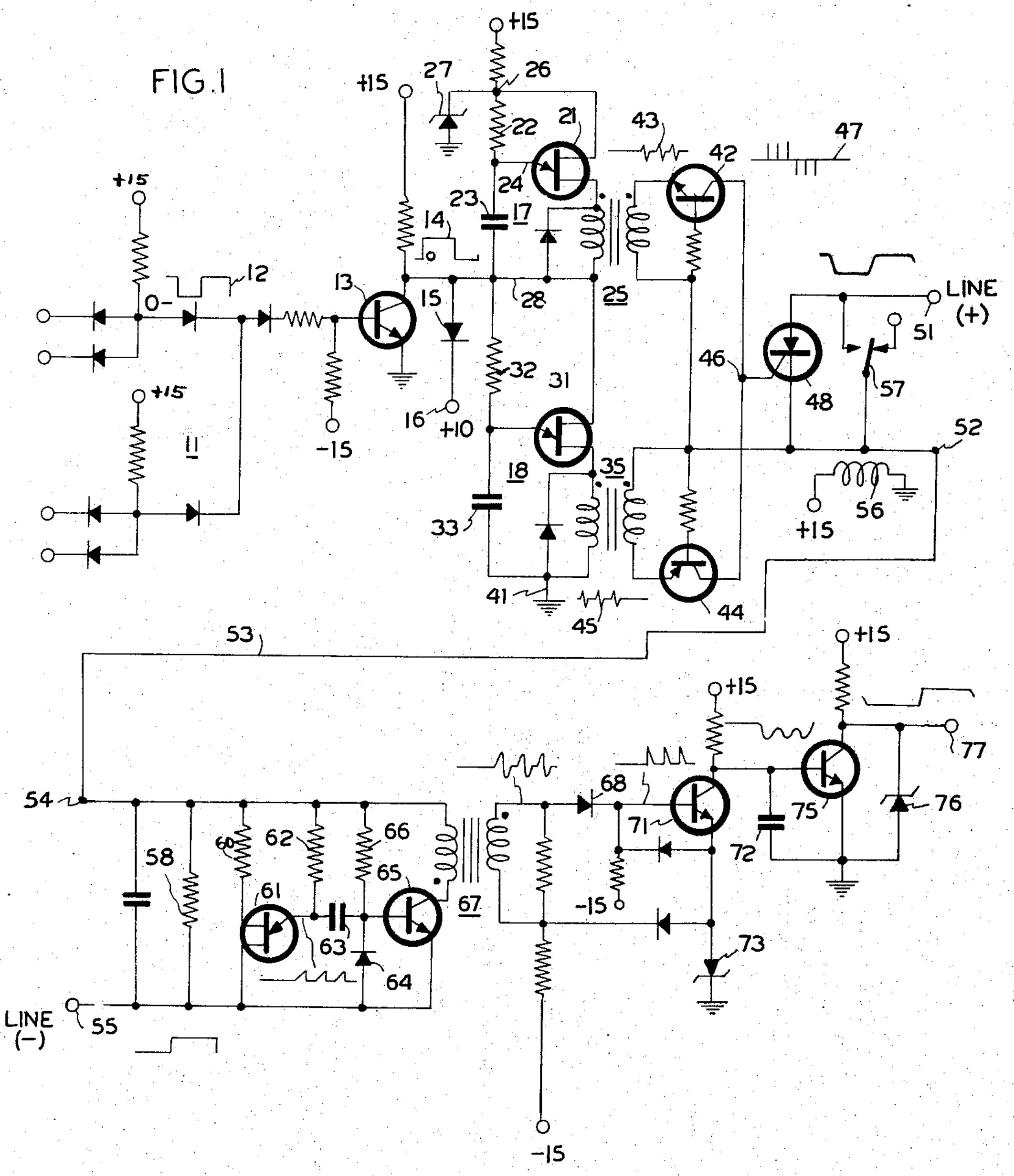

This invention relates generally to solid state relay circuits and, more particularly, to improved solid state relay circuits for transmission and reception on a communication line.

The use of solid state relay circuits for coupling binary data signals from a signal source to a communication line for transmission to a remote point has been provided in the past, such as, for example, the relays shown in the U.S. patents to Tyler, 2,999,170 and to Pickering et al., 3,148,286. While prior art arrangements such as these have proved satisfactory for particular applications, they have in general been relatively complex and do not provide all of the features that are desired in modern, high speed, reliable data communication for data processing systems.

The present invention provides solid state relay circuits for communication systems and is particularly adapted for use with data processing systems having high speed switching operation characterized by a precise definition of the transition between the so-called mark and space condition for the two states of the binary signals to be transmitted. The features of the invention include two separate oscillators and associated rectifier circuits to develop control signals for a controlled rectifier which switches the communication line. The control circuit is adapted to have a preferred state thereby avoiding ambiguity at the start and stop of message signals and the two oscillators in the control circuit permit an affirmative transition to either conductive or non-conductive state for the controlled rectifier which switches the line. The circuits are adapted for both transmission and reception to and from the communication line. When in transmission mode the affirmative nature of the control signal effectively maintains the state of the controlled rectifier in the presence of momentary open circuit conditions in the line and other disturbances. When in receiving mode the circuits are substantially immune to noise impulses on the line while maintaining a high degree of detectibility for true data transitions. Thus highly reliable performance is obtained for both transmission and reception and in view of the ability to control the controlled rectifiers with precision, their characteristics for high voltage switching make the apparatus in accordance with the invention usable with high voltage lines as well as lower voltage lines without the necessity for a multiple number of line switching semiconductors in series.

The features and objects of the invention are accomplished in accordance with one embodiment wherein two oscillators are controlled to be operative in alternation depending upon the state of the input binary signal with the oscillations utilized to control the switching rectifier across the transmission line. Upon being switched for reception the device utilizes a third oscillator for developing oscillations to control the detector for detecting the message of the incoming signal. In a second embodiment two oscillators are employed with suitable switching to permit the two oscillator system to be employed for either transmission or reception. In each case the affirmative control of the switching of the controlled rectifier that effects the line switching function is subject to affirmative transition signals upon the occurrence of a data transition with the result that the line is switched with reliability and precision to define the data transition and maintain the desired state between transitions.

Figure 2:
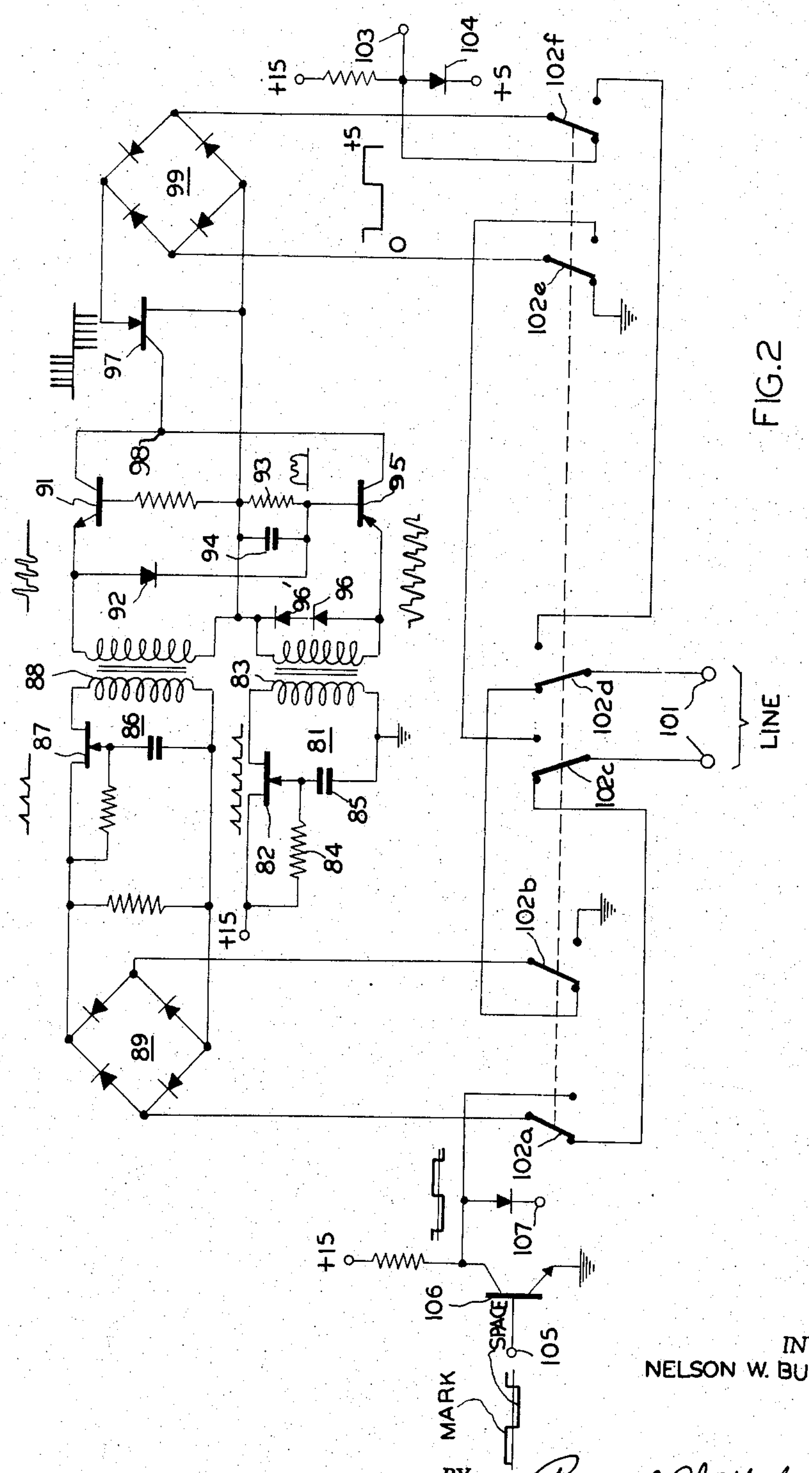

The objects and features of the invention will be apparent from the following detailed description taken in conjunction with the accompanying drawings wherein:

FIG. 1 is a schematic wiring diagram of a transmit and receive station employing oscillators alternately operative for sending and a separate receiver oscillator; and FIG. 2 is a schematic diagram of a send and receive station employing two oscillators.

Referring now to FIG. 1, a particular embodiment is disclosed having an input circuit 11 composed of suitable control gates. A typical data transition 12 is shown comprising a mark interval at the zero volt level followed by a space interval. The data signal 12 is applied to an inverter transistor 13 which remains cut off during the mark input signal of zero volt level thereby producing inverted output wave 14 having a voltage level during the mark interval of plus ten volts as determined by clamping diode 15 which is returned to a ten volt source 16. During the space portion of input signal 12 the transistor 13 is conductive and its collector falls to zero volts with respect to ground.

Two relaxation oscillator circuits 17 and 18 are employed in a manner such that one is always conducting but both can never be conducting together. The oscillator 17 comprises a unijunction transistor 21 controlled by a resistance 22 and capacitance 23 charging circuit with the junction between resistor 22 and capacitor 23 connected to control electrode 24 of the unijunction transistor 21. The transistor 21 is connected in series with the primary of a transformer 25. The circuit is supplied from a ten volt source maintained at junction 26 by a Zener diode 27. The return for the charging and discharge circuits of oscillator 17 is provided by line 28 which is connected to the collector of transistor 13 and has its potential controlled between plus ten volts as determined by diode 15 when transistor 13 is non-conducting and zero volts when transistor 13 is conducting. When transistor 13 is conducting and line 28 is at ground potential the oscillator 17 operates by charging capacitor 23 through resistor 22 from ten volt source 26 and discharging capacitor 23 through the path between electrode 24 and the junction with the base of transistor 21 through the primary of transformer 25 in a relaxation oscillator circuit. When transistor 13 is non-conductive, line 28 is at positive ten volt potential the same as junction 26 and the oscillator 17 is non-oscillatory due to the absence of a potential difference between the junction 26 and the line 28.

The oscillator 18 is in all respects similar to the oscillator 17 and employs a unijunction transistor 31 for charging the capacitor 33 through resistor 32 and is connected to discharge through the primary of a transformer 35. The operating potential for the oscillator 18 is the potential difference between the line 28 and ground 41. Thus when line 28 is at ground potential due to conduction in transistor 13, the oscillator 18 is non-oscillatory. When line 28 is at positive ten volts due to non-conduction in transistor 13, the oscillator 18 has a ten volt potential between line 28 and ground 41 and is thus oscillatory.

From the foregoing description of the oscillators 17 and 18 it is apparent that oscillator 17 is oscillatory during the space signal when transistor 13 is conductive and line 28 is at ground potential and that oscillator 18 is oscillatory during the mark signal when transistor 13 is non-conductive and line 28 is at positive ten volt potential. Thus these oscillatory conditions are mutually exclusive and represent the space and mark state of the incoming data signal 12.

The transformer 25 has its secondary connected to an

NPN transistor 42 and receives relaxation oscillations 43 during the space intervals of the input signal.

The transformer 35 has its secondary connected to a PNP transistor 44 and receives relaxation oscillations 45 during the mark portion of input signal 12. The PNP transistor 44 rectifies the positive half-cycles of oscillations 45 to produce a positive potential at an output junction point 46. The NPN transistor 42 rectifies the negative half-cycles of oscillations 43 to produce a negative potential at the junction point 46. This alternate positive and negative potential at the junction point 46 is represented as control wave 47 and serves as the control signal for a silicon controlled rectifier 48. It will be understood that the frequency of oscillators 17 and 18 can be made many times higher than the data rate of the signal 12. Thus the spacing between impulses indicated in wave 47 will be much less than that shown to permit recovery of the controlled rectifier state immediately after the opening of the line or by a disturbance which erroneously changes its state.

Since there is substantially no capacitance to ground from the junction point 46, the rectified impulses from the transistors 42 and 44 are applied as impulses to the control electrode of the controlled rectifier 48. The characterisitcs of silicon controlled rectifiers, such as rectifier 48, are such that they stay conductive until turned off by an opposite polarity impulse on the control electrode thereof connected to junction point 46. Should this occur through occurrence of noise signals or other disturbances reaching the control electrode of the silicon controlled rectifier 48, the next succeeding impulse from the then operative rectifier 42 or 44 would cause the controlled rectifier 48 to revert to its correct state. At a true data transition the impulse of wave 47 will reverse polarity and be effective to change the conductive state of the rectifier 48. The same protection against a false change in the state of rectifier 48 is provided if the rectifier becomes nonconductive due to a momentary open circuit in the line across which the rectifier 48 is connected.

Controlled rectifier 48 is connected to terminals 51 and 52 which can be connected to the outgoing communication line. Such a line, if the system were used solely for transmission, would be switched by the change between conductive and non-conductive states of the rectifier 48 and thus communication on the line would correspond to the input data wave 12.

The transmit mode terminals 51, 52 are adapted to include reception mode by connecting terminal 52 via a line 53 to a terminal 54. The actual communication line is thus connected to terminal 51 and a terminal 55. During transmission the line closure is completed from terminal 51, the controlled rectifier 48 (when conducting), line 53 and a resistor 58 connected between terminals 54 and 55. This resistor 58 is actually across the receiver circuit input which thus generates a side tone signal corresponding to the transmitted massage. During reception the controlled rectifier 48 is made continuously conductive by appropriate control signal at inputs 11 and the incoming communication line signals appear across the resistor 58 at the input of the receiver circuit.

A relay 56 energized from the +15 volt source keeps a contact 57 open between terminals 51 and 52. If power fails the contact 57 closes to prevent a continuous open across the transmission line terminals 51, 55.

During reception the incoming signals are applied from the line across resistor 60 in series with a unijunction transistor 61 and a charging circuit comprising resistor 62, capacitor 63 and the base current path of an NPN transistor 65. Base current to transistor 65 is supplied through a resistor 66 and a diode 64 is connected across the base-emitter terminals of transistor 65 to limit the negative turn off voltage.

The transistor 65 has its collector connected to the primary of a transformer 67 with the secondary thereof connected with the polarity indicated to a diode rectifier 68. The diode 68 couples impulses from the secondary of transformer 67 to the base of an NPN transistor 71 and the positive half cycles applied to the base by the diode 68 switch the transistor 71 into conduction to discharge the capacitor 72. The negative 4.6 volt Zener reference voltage for the emitter of transistor 71 is maintained by Zener diode 73 to provide a threshold above which the input signal from transformer 67 must rise in order to provide sufficient magnitude positive half-cycles to switch transistor 71.

When transistor 71 switches to discharge capacitor 72 a normally conducting transistor 75 is switched to non-conduction state thereby raising its collector to a positive voltage level determined by a Zener reference diode 76. This positive voltage level which appears at terminal 77 with respect to ground is in fact the output signal representing a mark input signal from the line terminals 54, 55. The repetition of the switching inputs from oscillator 61 to the base of transistor 71 maintains the capacitor 72 discharged below the voltage at which transistor 75 will switch back into conduction for the duration of the mark signal.

The operation of the receiver circuit of FIG. 1 will now be described. When the telegraph line is open to produce a space signal, the net voltage across the line input terminals 54, 55 is zero. The oscillator 61 will be non-oscillatory and the signal voltage across the transformer 67 will be zero. Transistor 71 in the line output circuit will be held OFF by the minus 15 volt supply and transistor 75 will be held ON from the positive 15 volt supply. Output voltage of transistor 75 will be at zero volts to correspond to a space signal of the line.

When the telegraph line is closed to produce a mark signal, line current will flow through controlled rectifier 48 to develop a net voltage across the input terminals 54, 55. As line current increases to a maximum, current will flow through resistor 62 to charge capacitor 63 and through resistor 66 to supply base current to transistor 65. The voltage at the junction of resistor 62 and capacitor 63 rises exponentially to the breakdown voltage of the unijunction transistor 61 to turn it on. Capacitor 63 will then discharge through the emitter junction of the unijunction transistor 61 to turn it and transistor 65 off. On turning transistor 65 off, and with the transformer 67 winding polarized as shown, the voltage applied to diode 68 will rise to make diode 68 and transistor 71 both conduct. Voltage across the capacitor 72 then discharges through the collector junction of transistor 71 to the reference voltage of Zener 73 thereby turning transistor 75 off. The collector voltage of transistor 75 will rise from zero to the reference voltage of Zener 76 to correspond to the mark signal of the telegraph line.

During each cycle of oscillation of the oscillator 61 the timing capacitor 63 completely discharges and transistor 65 will again conduct; the secondary voltage of transformer 67 will be driven negative to turn diode 68 and transistor 71 off. Voltage across capacitor 72 then charges toward the positive 15 volt supply tending to turn transistor 75 on. While the voltage across capacitor 72 is increasing, the oscillator 61 will complete another cycle to turn transistor 71 on thereby discharging capacitor 72 and maintaining transistor 75 off as long as the oscillator 61 is oscillating. To insure against a premature switching of the output at terminal 77 during the mark period, the relaxation period of the oscillator 61 must be less than the charging period of capacitor 72 to the voltage turn-on level of transistor 75.

Referring now to FIG. 2, an alternate embodiment employing a continuously running oscillator will be described. A continuously running relaxation oscillator 81 consists of a unijunction transistor 82, a transformer 83 and an RC charging circuit consisting of resistor 84 and capacitor 85.

A second similar relaxation oscillator 86 employs a unijunction transistor 87 and a transformer 88. The oscillator 86 oscillates in accordance with the occurrence of mark and space signals derived from a diode bridge 89 as hereinafter described.

The secondary of transformer 88 is connected to a rectifier circuit employing an NPN transistor 91 thereby producing on the collector electrode of transistor 91 negative polarity rectified potential. The secondary of transformer 88 is also coupled by a diode 92 to rectify positive portions of the wave form and develop across resistor 93 and capacitor 94 a positive polarity rectified potential.

The secondary of transformer 83 is connected to a rectifier circuit employing a PNP transistor 95 which produces on its collector electrode a positive polarity rectified potential. The action of the diode 92 in applying a positive potential to the base of transistor 95 is to cut off transistor 95 whenever alternating signals appear at the secondary of transformer 88. To assist in this action series diodes 96 may be connected across the secondary of transformer 83 to limit the positive potential supplied to the emitter of transistor 95.

The collectors of transistor 91 and 95 are joined together to a common point 98 which is connected to the control electrode of a silicon controlled rectifier 97. This control electrode controls the conductivity of the controlled rectifier 97 in accordance with the polarity of the rectified signals at point 98. The controlled rectifier 97 is connected across a bridge 99 to switch the mark and space signals for both transmit and receive as hereinafter described.

The embodiment of FIG. 2 switches line terminals 101 between the diode bridges 89 and 99 by means of a switch 102 having double throw contacts *a, b, c, d, e, f*. The switch 102 is shown in the receive position which connects line terminals 101 across the diode bridge 89. For this condition the output diode bridge 99 is connected across an output circuit which supplys the mark and space signals to an output terminal 103 clamped with reference to a suitable potential by means of a diode 104.

When the switch 102 is transferred to the opposite contacts from the position shown in FIG. 2, the transmitting mode prevails and for such condition the operation of the circuit will now be described. Assuming that switch 102 has been transferred to the opposite contacts from those shown in FIG. 2, transmission takes place as follows. Mark and space signals are supplied to a terminal 105 for inversion in a transistor 106 and application to the bridge 89. The signals at terminal 105 are derived from a data processing machine logic and are applied to the bridge 89 referenced to a suitable voltage level at terminal 107.

During the mark portion of the message, the oscillator 81, which is continuously oscillating, produces positive rectified potential through transistor 95 which makes the silicon controlled rectifier 97 conductive thereby effectively closing the circuit across line terminals 101. When a space signal is applied at input terminal 105, the inverter 106 applies positive potential through the bridge 89 to cause oscillator 86 to oscillate thereby applying oscillations to transistor 91 which are rectified to produce a negative potential at the control electrode of silicon controlled rectifier 97. The positive portions of the oscillations from transformer 88 are applied by diode 92 to cut off transistor 95 thereby eliminating the positive rectified potential which it supplies during a mark interval. Thus the silicon controlled rectifier 97 is maintained non-conductive during the space interval and line terminals 101 are effectively open circuited.

During reception mode the incoming line signals applied to bridge 89 operate oscillator 86 during space intervals and the switching of the controlled rectifier 97 is entirely analogous to the action described for transmission mode.

Modifications of the herein disclosed circuits will occur to those skilled in the art and various combinations of the circuits will be capable of use together to achieve the desired results of the invention. The scope of the invention is to be interpreted accordingly, as defined by the appended claims.

I claim:

1. A communication line solid state relay for switching in response to mark and space signals comprising
   (a) two oscillators,
   (b) two opposite polarity rectifier circuits,
   (c) two transformers,
   (d) circuits connecting the primary of each of said transformers to a different one of said oscillators and the secondary of each of said transformers to a different one of said rectifier circuits,
   (e) an output circuit including a controlled rectifier connected for switching said output circuit,
   (f) a direct connection from the opposite polarity outputs of said rectifier circuits to the control electrode of said controlled rectifier,
   (g) means responsive to said mark and space signals for determining which of said rectifier circuits will be operative to rectify the oscillation of its oscillator thereby determining the polarity of rectified signal applied to said control electrode for switching said output circuit,
   (h) a receiving circuit having an input circuit, an oscillator coupled to the primary of a transformer, a rectifier circuit coupled to the secondary of said transformer in said receiving circuit, and signal controlled switching means responsive to the output of said rectifier circuit in said receiving circuit, and
   (i) means for coupling said communication line to said output circuit and said input circuit for transmission and reception of said mark and space signals.

2. A communication line solid state relay for switching in response to mark and space signals comprising
   (a) two oscillators,
   (b) two opposite polarity rectifier circuits,
   (c) two transformers,
   (d) circuits connecting the primary of each of said transformers to a different one of said oscillators and the secondary of each of said transformers to a different one of said rectifier circuits,
   (e) an output circuit including a controlled rectifier connected for switching said output circuit,
   (f) a direct connection from the opposite polarity outputs of said rectifier circuits to the control electrode of said controlled rectifier,
   (g) means responsive to said mark and space signals for determining which of said rectifier circutis will be operative to rectify the oscillation of its oscillator thereby determining the polarity of rectified signal applied to said control electrode for switching said output circuit,
   (h) a receiving circuit having an input circuit, and
   (i) means for coupling said communication line to said output circuit and said input circuit for transmission and reception of said mark and space signals.

3. A communication line solid state relay for switching in response to mark and space signals comprising
   (a) two oscillators,
   (b) two opposite polarity rectifier circuits,
   (c) two transformers,
   (d) circuits connecting the primary of each of said transformers to a different one of said oscillators and the secondary of each of said transformers to a different one of said rectifier circuits,
   (e) an output circuit including a controlled rectifier connected for switching said output circuit,
   (f) a direct connection from the opposite polarity outputs of said rectifier circuits to the control electrode of said controlled rectifier, and
   (g) means responsive to said mark and space signals for determining which of said rectifier circuits will be operative to rectify the oscillation of its oscillator thereby determining the polarity of rectified signal applied to said control electrode for switching said output circuit.

4. A communication line solid state relay for switching in response to mark and space signals comprising
(a) two oscillators,
(b) two opposite polarity rectifier circuits,
(c) two transformers,
(d) circuits connecting the primary of each of said transformers to a different one of said oscillators and the secondary of each of said transformers to a different one of said rectifier circuits,
(e) an output circuit including a controlled rectifier connected for switching said output circuit,
(f) a direct connection from the opposite polarity outputs of said rectifier circuits of the control electrode of said controlled rectifier, and
(g) an input circuit responsive to the signal to be transmitted for switching one or the other of said two oscillators into oscillation in accordance with the mark and space state of said signals thereby controlling the polarity of said control electrode for switching said line.

5. A communication line solid state relay for switching in response to mark and space signals comprising
(a) two relaxation oscillators each having a charging time constant circuit with charging potential terminals,
(b) two opposite polarity rectifier circuits,
(c) two transformers,
(d) circuits connecting the primary of each of said transformers to a different one of said oscillators and the secondary of each of said transformers to a different one of said rectifier circuits,
(e) an output circuit including a controlled rectifier connected for switching said output circuit,
(f) a direct connection from the opposite polarity outputs of said rectifier circuits to the control electrode of said controlled rectifier,
(g) an input circuit comprising a switch transistor responsive to the signal to be transmitted to switch between conductive and non-conductive states,
(h) a first voltage supply circuit coupled to said charging potential terminals of one of said oscillators through the conductive path of said switch transistor, and
(i) a second voltage supply circuit coupled to said charging potential terminals of the other of said oscillators and connected to be short circuited by the conductive path through said switch transistor, the junction of said first and second supplies connected to said conductive path providing a potential when said switch transistor is non-conductive equal to the magnitude of said first voltage supply thereby making the potential difference across said charging potential terminals of said one of said oscillators zero.

6. A communication line solid state relay for switching in response to mark and space signals comprising (a) first and second oscillators, said first oscillator connected for continuous operation,
(b) two opposite polarity rectifier circuits,
(c) two transformers,
(d) circuits connecting the primary of each of said transformers to a different one of said oscillators and the secondary of each of said transformers to a different one of said rectifier circuits,
(e) circuit means energized by the rectified output of said second oscillator for suppressing the rectified output from said first oscillator,
(f) an output circuit including a controlled rectifier connected for switching said output circuit,
(g) a direct connection from the opposite polarity outputs of said rectifier circuits to the control electrode of said controlled rectifier,
(h) an input circuit, and
(i) means responsive to said mark and space signals applied to said input circuit for controlling said second oscillator to be oscillating or non-oscillating thereby determining the polarity of rectified signal applied to said control electrode for switching said output circuit.

7. Apparatus according to claim 6 and including selective switch means for switching said communication line between said output circuit and said input circuit.

8. A communication line solid state receive relay comprising
(a) an input circuit coupled to said line,
(b) an oscillator coupled to be alternately energized and not energized by the mark and space signals at said input circuit,
(c) a transformer coupled to said oscillator,
(d) a rectifier circuit coupled to said transformer,
(e) an output circuit including a switch transistor having a preferred conductive state and switchable to the opposite state,
(f) a time constant circuit for maintaining said opposite state of said switch transistor for a predetermined time interval, and
(g) a control transistor responsive to rectified impulses from said rectifier circuit for switching said switch transistor into said opposite state and setting said time constant circuit to start said predetermined time interval, said predetermined time interval being long compared to noise impulses on said line but shorter than the transition interval of said mark and space signals.

References Cited

UNITED STATES PATENTS

| | | | |
|---|---|---|---|
| 2,993,958 | 7/1961 | Barnes | 178—66 X |
| 2,999,170 | 9/1961 | Tyler | 307—88.5 |
| 3,271,588 | 9/1966 | Minc | 178—66 |

ROBERT L. GRIFFIN, *Acting Examiner.*

J. T. STRATMAN, *Assistant Examiner.*